United States Patent [19]

Dempster

[11] Patent Number: 5,377,458
[45] Date of Patent: Jan. 3, 1995

[54] PRESSURE BALANCING A CLOSED ECOLOGICAL SYSTEM

[75] Inventor: William F. Dempster, Oracle, Ariz.

[73] Assignee: Decisions Team, Inc., Fort Worth, Tex.

[21] Appl. No.: 32,387

[22] Filed: Mar. 18, 1993

Related U.S. Application Data

[60] Division of Ser. No. 630,269, Dec. 19, 1990, Pat. No. 5,279,081, which is a continuation-in-part of Ser. No. 481,911, Feb. 16, 1990, abandoned.

[51] Int. Cl.⁶ ............................................. E04H 9/00
[52] U.S. Cl. ................................ 52/1; 52/2.22; 52/2.26
[58] Field of Search ............... 52/1, 2.16, 2.17, 2.22, 52/2.23, 2.11, 2.26

[56] References Cited

U.S. PATENT DOCUMENTS

| | | | |
|---|---|---|---|
| Re. 33,019 | 8/1989 | Rhodes et al. | 52/63 |
| 1,402,077 | 1/1922 | Lanchester | 52/83 |
| 2,355,248 | 8/1944 | Stevens, Jr. | 52/2.26 |
| 3,057,368 | 10/1962 | Seaman | 52/2.17 |
| 3,120,320 | 2/1964 | Wissmiller | 52/2.11 |
| 3,749,332 | 7/1973 | Gray | 244/163 |
| 4,296,585 | 10/1981 | Bini | 52/218 |
| 4,299,066 | 11/1981 | Thompson | 52/236.2 |
| 4,300,029 | 11/1981 | Maser | 200/159 B |
| 4,484,420 | 11/1984 | Stokes | 52/2.18 |
| 4,572,176 | 2/1986 | Walther | 128/204.26 |
| 4,608,278 | 9/1986 | Rhodes et al. | 52/63 |
| 4,664,065 | 5/1987 | Schneider | 119/5 |
| 4,936,060 | 6/1990 | Gelinas et al. | 52/2.18 |

FOREIGN PATENT DOCUMENTS

| | | |
|---|---|---|
| 0111754 | 6/1984 | European Pat. Off. |
| 0386578 | 9/1990 | European Pat. Off. |
| 2596171 | 9/1987 | France |

*Primary Examiner*—James L. Ridgill, Jr.
*Attorney, Agent, or Firm*—Christie, Parker & Hale

[57] ABSTRACT

A pressure compensating lung balances pressure between open and closed environments which are substantially isolated from and independent of each other, for example, the Earth's open environment and the closed environment of a second, smaller closed ecological system, Biosphere 2. The lung has an airtight housing and a barrier which includes a flexible membrane, one side of which faces Biosphere 2 and the other side of which faces the outside, with a central pan the perimeter of which is surrounded by the membrane. The membrane has approximately the shape of a surface of a torus. It deviates from a toroidal shape sufficiently to avoid substantial circumferential tension in the membrane. The weight of the pan exerts a positive pressure on the atmosphere in Biosphere 2 for preventing inward leaks. The pan and membrane are protected by a weather cover which can be sealed against the outside environment so that a fan can affect the air pressure from the outside acting on the membrane, and hence the pressure difference between the inside of Biosphere 2 and the Earth's atmosphere.

16 Claims, 4 Drawing Sheets

Fig. 2

PRESSURE BALANCING A CLOSED ECOLOGICAL SYSTEM

CROSS-REFERENCE TO RELATED APPLICATION

This application is a division of U.S. patent application Ser. No. 07/630,269 filed Dec. 19, 1990 now U.S. Pat. No. 5,279,081 issued Jan. 18, 1994, which is a continuation-in-part of application Ser. No. 07/481,911, filed Feb. 16, 1990, now pending and to be abandoned.

FIELD OF THE INVENTION

This invention relates to a pressure compensation system for a closed ecological system. In particular for a closed system including humans, which is completely isolated from the Earth's environment insofar as transfer of matter is concerned. The system is open for transfer of energy and information. The closed ecological system is operated to provide sustenance for the human occupants and a stable environment with stable pressure difference between the inside and outside.

BACKGROUND OF THE INVENTION

The Earth itself comprises a biosphere in which microorganisms, plants, and animals, including humans, exist in a more or less steady state, wherein matter is a finite resource which is continually recycled. There is continual energy input in the form of solar radiation. The quantity of matter gained or lost to space outside the Earth's atmosphere is minute. Thus, the Earth is a closed ecological system or biosphere. Although the Earth recycles matter continually between the soil, oceans, atmosphere, biomass, and the like, in a nearly steady state, there appear to be a drift of conditions as indicated by increasing carbon dioxide concentration in the atmosphere, the well-known "ozone hole," and other effects which may not have been detected as yet.

It is desirable to provide a microcosm of the biosphere known as Earth for study of the interaction of components, and development of techniques for influencing our environment. Such experiments are difficult at best in the open system provided on Earth, where matter is exchanged between the Earth's environment and the experiment itself. It is, therefore, desirable to provide a system that is completely enclosed so that no matter is exchanged with the Earth's environment. It is desirable to have humans within this miniaturized biosphere to provide control, and conduct scientific research within a closed system where conditions may be varied as desired.

Being a closed system having humans within the system requires that they be provided with a balanced diet for long-term health and that closed cycles be established for carbon, oxygen, nitrogen, other nutrients, water, and the like, so that the closed system may remain in a more or less steady state for the long periods of time required for conducting meaningful scientific research.

There is, therefore, being established near Oracle, Ariz., a completely closed ecological system referred to as Biosphere 2. The system completely encloses a hectare of land and 142,000 cubic meters of space isolated from the Earth's environment by an impermeable skin so that no matter is transferred. The portion of the skin above the ground is transparent for receiving solar radiation. Electrical energy is provided to the closed system, and heat may be transferred to or from the system as required. Thus, the Biosphere 2 closed ecological system is closed as to matter, but open as to energy. For meaningful research, it also remains open for information transfer.

The Earth's barometric pressure varies according to a large number of different factors, but remains consistent within a limited range because the Earth's gravitational pull and the mass of the atmosphere remain consistent. The effects of local changes in temperature and atmosphere density are quickly dissipated to other local areas.

Biosphere 2 is a relatively small completely airtight enclosure which, therefore, has important differences from the biosphere of Earth and from a conventional building enclosure. In a conventional building, when the air inside is heated or cooled or has a change in humidity, the resulting expansion or contraction of that atmosphere will leak out or draw outside air into the building. In such a case, no important pressure difference is created between the inside and the outside of the building because the leakage slowly equalizes the pressures. Because Biosphere 2 is a closed structure, there is no leakage. Therefore, unless the structure were built to be much stronger than otherwise necessary, the resulting pressure differences could burst or crush the structure.

Biosphere 2 is designed to prevent these dangerous forces by incorporating pressure balancing "lungs". The lungs are a part of the enclosure that is able to change its volume in response to changes in temperature and/or humidity inside Biosphere 2 or barometric pressure outside Biosphere 2. The weight of the movable portion of the lungs provides a controlled positive pressure inside the Biosphere 2 to prevent inward leaks. Two such lungs provide the desired variable volume in this case, although one or more lungs of adequate total volume could in principle suffice.

SUMMARY OF THE INVENTION

Currently there is no device available for solving the problems mentioned above. The present invention is a pressure compensating lung for use between a first and a second pressure domain, preferably Earth's atmosphere and Biosphere 2, for maintaining a relatively constant pressure differential between these domains regardless of changes in conditions in either domain. The lung has a flexible membrane between the first and second domains, the membrane being supported around its perimeter and sealed to prevent fluid from moving between the domains. The membrane flexes to compensate for fluid volume differences between the domains while pressure differences remain small. That is, the flexibility of the membrane prevents substantial changes in the fluid pressure difference between the two domains. The membrane is fluid impermeable to at least the degree that the entire system is deemed impermeable. The lung also has a rigid substantially horizontal pan sealed and supported around its perimeter by the membrane. One of the domains, the Earth's atmosphere, is open to the area above the pan and the other domain, Biosphere 2, is open to the area below the pan. There are means for supporting the weight of the pan against the gravitational pull which limit the downward travel of the pan but not its upward travel as the pan moves for changing the volume of the second domain and thereby limit pressure differences between the domains.

The lung also has a weather cover which partially seals the membrane from the first domain and has a fluid pump between the first domain and the membrane for regulating the fluid pressure on the first domain side of the membrane. The lung is preferably physically separated from the main portion of the second domain so that the second domain is connected to the membrane through a passage. In a preferred embodiment, the second domain is a human habitat and the pressure compensated fluid in the human habitat is breathable air. The passage connecting the membrane to the main portion of this human habitat is an air passage large enough to allow humans in the habitat access to the membrane using the air passage.

The surface of the membrane is approximately a portion of the surface of a toroid. It deviates from a toroidal shape enough that there is never a substantial circumferential tension in the membrane as the pan moves between its upper and lower positions.

DETAILED DESCRIPTION

Figure 1:
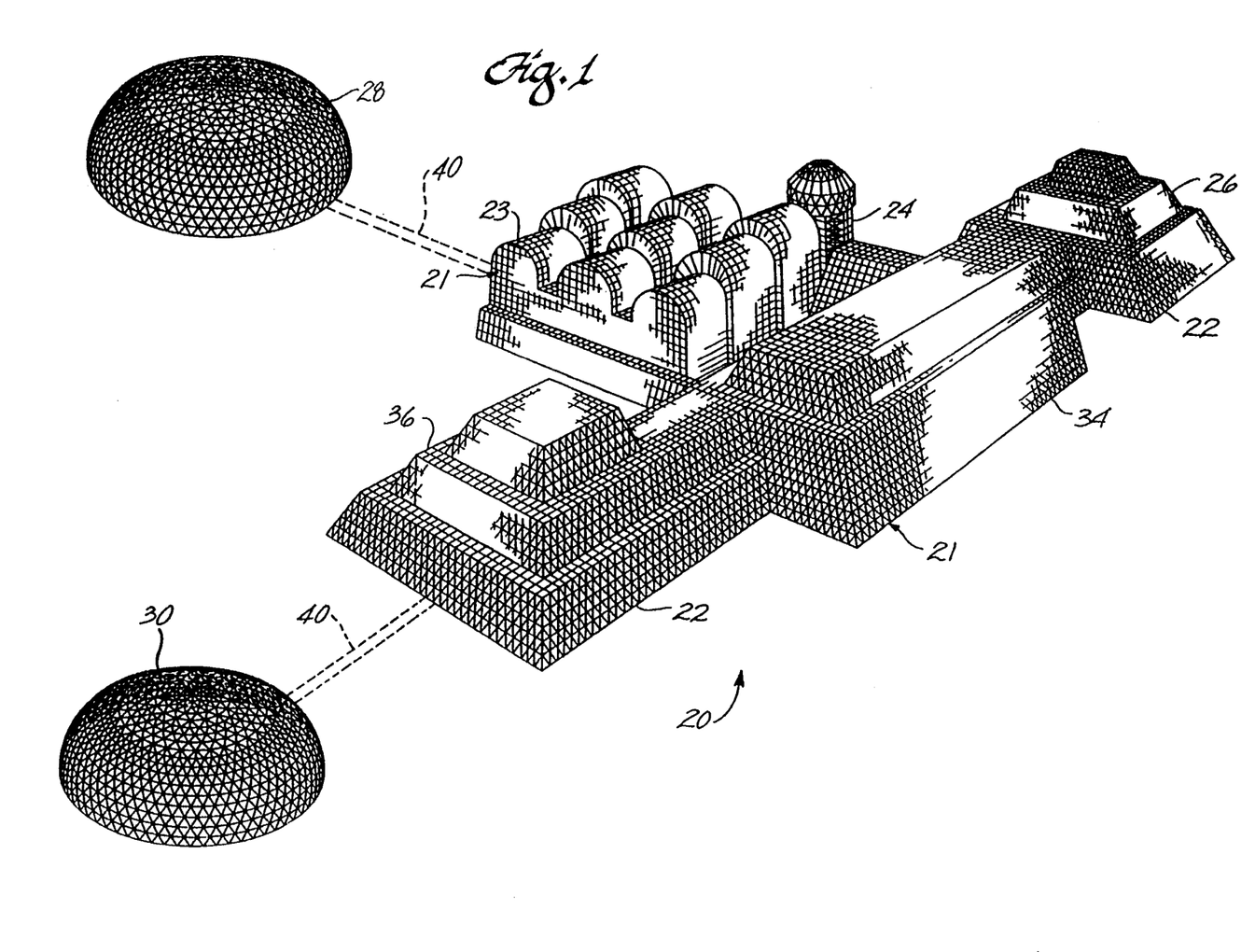
FIG. 1 is a perspective view of Biosphere 2, a completely enclosed ecological system together with its two lungs operated in accordance with this invention.

The main structure 20 of a closed ecological system, Biosphere 2, as shown in FIG. 1 has a concrete foundation on a gentle hillside with a glazed tubular steel space frame 21 erected on the concrete foundation. The foundation includes a welded and leak-tested stainless steel sheath embedded in the concrete to prevent transfer of air, water or other matter through the foundation. The major part of the above-ground structure is covered with glass walls wherein all of the joints are tightly sealed. The glass is also sealed to the stainless steel sheath in the foundation so that no air or other matter is transferred between the interior of the closed ecological system and the Earth's environment.

The system is constructed to operate at a pressure of about 1500 dynes per square centimeter greater than ambient atmospheric pressure. Two large variable volume pressure-compensating lungs or accumulators 28, 30 connect to the interior of the main structure 20 through subterranean ducts 40 and compensate for ambient pressure changes, temperature changes, and the like for balancing the pressure inside the closed system against atmospheric pressure.

There are three principal portions to the closed main structure 20. First, there is an elongated wilderness module structure 22 covering about 0.6 hectare. Second, to one side of the wilderness module structure, is an intensive agricultural module 23, which is open to the wilderness module. Third, on one side of the intensive agricultural module is a living habitat 24 where the human and other animal occupants of the closed ecological system are housed. The humans, of course, may traverse the entire system for agriculture, control, maintenance, and the like.

Not illustrated herein, since not required for an understanding of this invention, are details of the living quarters for the humans, a variety of laboratories and workrooms, plus a substantial complex of subterranean pumps, fans, storerooms, and the like.

The wilderness biomass forming the largest part of the closed ecological system has a tall, roughly pyramidal space frame structure 26 at its uphill end which is approximately 26 meters high and 1900 square meters in floor area. There is a tropical rain forest kept moist by condenser coils and sprays, a tropical savannah at the top of rock cliffs, fresh-water and salt-water marshes, and a salt-water ocean. The transition section between the tropical savannah and a desert at the lowest elevation of the wilderness biomass has a thorn-scrub forest.

The savannah and thorn-scrub forest are housed in a more or less flat-topped, glazed, space frame module 34 with a generally trapezoidal cross section. The desert biome is in a generally pyramidal space frame module 36 at the lowest elevation end of the wilderness biome. The humidity in the wilderness biome is higher than many desert regions, so the plants selected for growth in the desert biome are those typically found in coastal fog deserts where there is low rainfall but high humidity.

Figure 2:
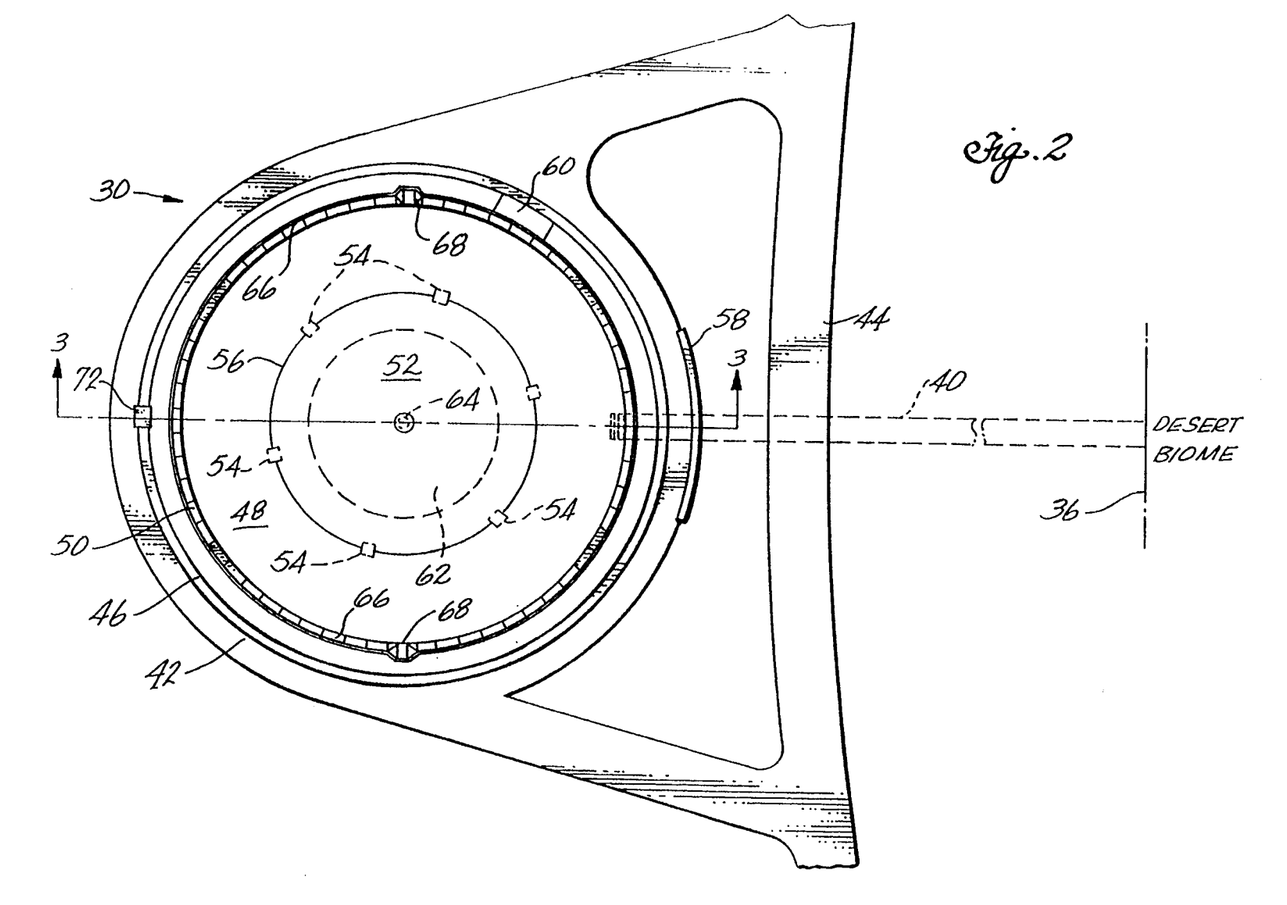
FIG. 2 is a cross-sectional plan view of one of the lungs constructed according to the invention.

FIG. 2 is a cross-sectional view of a lung 30 from above. It shows the basic floor plan of the lung 30 and its connection to the desert biome 36. An airtight duct 40 forms an air passage from the interior of the desert biome 36 to an interior chamber 35 of the lung 30. The duct is a subterranean pipe with a diameter large enough for people to walk through, e.g. about 2.5 meters. This allows the human occupants of Biosphere 2 to make repairs to the inside of the lung without leaving the sealed system. Burying the pipe minimizes temperature variations and weather damage.

An access road 42 surrounds the lung and connects to a main access road 44 to allow maintenance vehicles to reach the lung. An outer weather cover 46 covers the entire lung. The weather cover is a dome shaped (see e.g. FIG. 1), free standing metal construction. It need not be airtight although it is preferred that it resist air penetration enough that a fan 72 in the weather cover can be used to manipulate the barometric pressure within the weather cover. It is also preferred that the weather cover include windows tightly sealed against the metal structure. The windows illuminate the interior and allow viewing by visitors. For Biosphere 2 two lungs are used, each with a membrane diameter of 48 meters. For smaller or larger structures differing numbers of lungs with different dimensions may be used.

The active parts of the lung 30 are enclosed and protected within the weather cover 46. The primary active part is a barrier to prevent air from passing from the interior side of the lung to the exterior. The barrier includes a flexible membrane 48 supported by a ring wall 50 and a metal pan 52 supported by a set of support posts 54 around the pan's circumference or perimeter 56. The pan is fastened to and sealed against the membrane which is fastened to and sealed against the ring wall 50. The membrane and pan together completely seal the environment inside the duct 40 and chamber 35 from the environment inside the weather cover 46. The pan in the present example is about 28 meters in diameter and the membrane together with the pan have an outside diameter of about 47.8 meters. The annular membrane closes the ten meter wide gap between the edge of the pan and the wall of the enclosure.

The pan is preferably made of stiffened aluminum. Its construction is described in more detail in connection with FIGS. 6–9. The membrane which is 13.5 meters wide is preferably made of a flexible material 16 millimeters thick with two-ply polyester reinforcement and a coating to enhance its airtightness. A chlorosulfonated polyethylene such as that sold under the trademark "HYPALON" is presently preferred. The membrane weighs about 2.2 kilograms per square meter of which about 140 grams is reinforcing material. For the purposes of the present example it is considered sufficient if the membrane has a tensile strength of about 480 Newtons per cm. width.

While the structure is referred to as a "lung," in contrast with animal lungs no matter is transferred between the inside and outside of the lungs. For Biosphere 2 an impermeable membrane is used so that the inside is completely sealed off from the outside. The "lung" serves as a means for varying the volume of the closed system, thereby maintaining a selected pressure difference between the closed system and the atmosphere.

The lung structure in the present embodiment happens to be built on an incline but the floor and pan are basically horizontal. A retaining wall 58 keeps the access road 42 free and protects the weather cover on the uphill side of the incline. A six meter wide ramp 60 through a door in the weather cover allows equipment to be brought into the lung from the main access road 44.

Below the membrane in the chamber 35 is a well 62 and a sump 64 to serve as a tank for storing reserve water for utilization within Biosphere 2. The sump for such a lung is located at the lowest elevation of the closed system, with floors sloping toward the sump. Natural drainage, therefore, returns water to the sump. Emergency fire pumps (not shown) are located at the sump for supplying water to sprinklers and other fire fighting outlets. In an emergency, drainage of water used for fire fighting returns to the sump for reuse.

Figure 4:
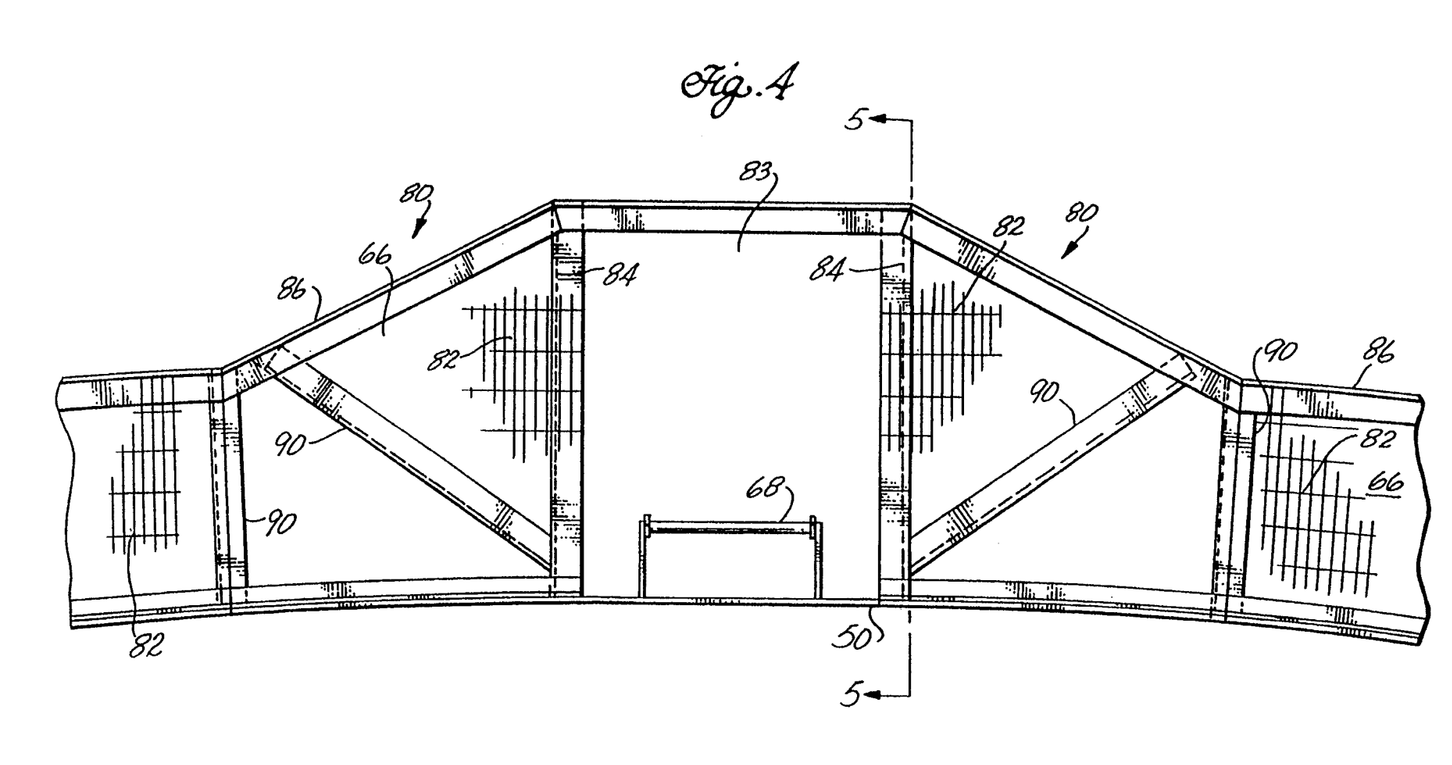
FIG. 4 is a fragmentary plan view of the access walkway around a lung of the present invention.

The ring wall 50 includes an observation and maintenance walkway 66 which surrounds the entire membrane. The walkway is a little less than a meter wide with access ladders 68 at opposite ends. The walkway allows access to the membrane over the ring wall 50 for men and equipment and is more completely described with respect to FIGS. 4 and 5. The ring wall is about 7.3 meters above the floor under the membrane so that when the membrane is completely slack it does not sag to the floor level. The membrane is kept suspended above the floor so that it will not chafe on the floor. Exemplary clearance above the floor is about 20 centimeters.

Figure 3A:
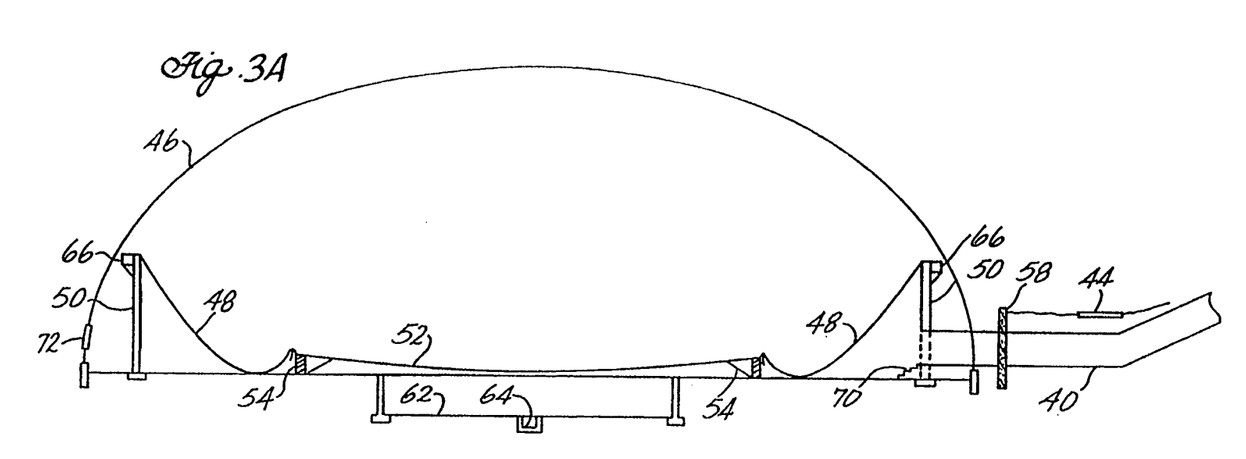
FIG. 3A is a cross-sectional side view of the lung of FIG. 2 taken along line 3—3 when the volume in Biosphere 2 is contracted.
Figure 3B:
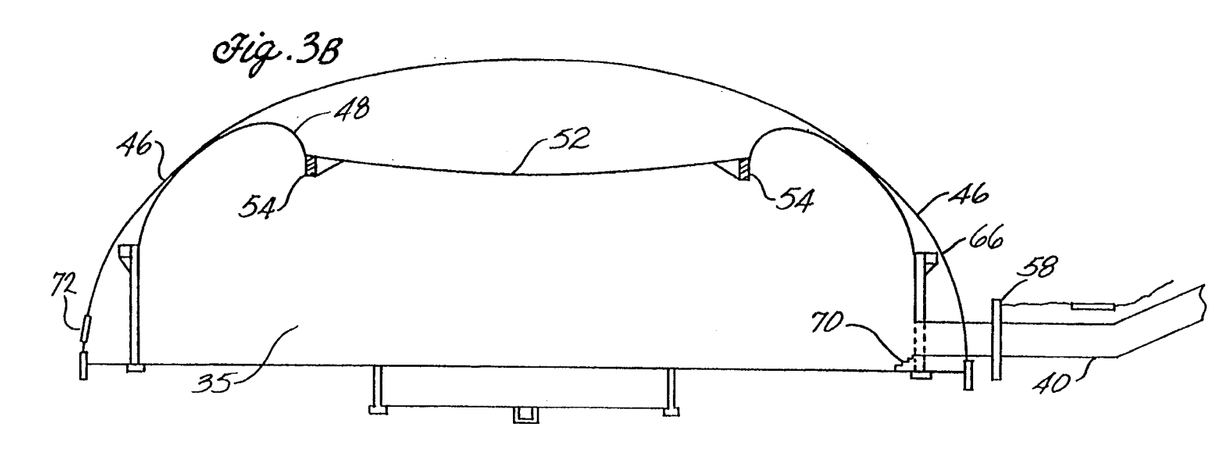
FIG. 3B is a cross-sectional side view like that of FIG. 3A when the volume in Biosphere 2 is expanded.

FIGS. 3A and 3B are sectional views showing the lung from the side. FIG. 3A shows the lung when the volume of air in the system is relatively low due to low temperatures, for example. FIG. 3B shows the lung when the inner air volume is relatively high. In FIG. 3A, the disk shaped metal pan 52 and support posts 54 rest completely on the floor. The flexible membrane 48 bows substantially in its peripheral path from the ring wall 50 to the pan.

In FIG. 3B, the air volume in Biosphere 2 has increased significantly, such as occurs when the system warms during the day. The increased air volume flows through the duct and pushes against the underside of the pan and membrane, that is, the inside face of the membrane. FIG. 3B shows the pan at virtually the upper limit of its travel, about 14 meters above its lowermost position. The membrane bows outwardly due to the pressure from below. FIGS. 3A and 3B demonstrate the large change in interior volume possible within the lung. This large capacity is necessary because Biosphere 2 itself has rigid walls. When the barometric pressure outside Biosphere 2 varies for any number of climatic reasons or when the temperature and humidity inside Biosphere 2 changes, the lungs are the primary pressure balancing devices for maintaining the safety of the Biosphere 2 walls.

Normally the volume of air within the Biosphere 2 is sufficient to "float" the pan somewhere midway between the extremes illustrated. The pan is relatively heavier per unit area than the membrane, and the membrane bulges upwardly somewhat as illustrated in FIG. 3B as air pressure buoys the pan off the floor. Since the annular membrane is symmetrical, the pan remains centered in the weather housing. The membrane is sufficiently strong to carry the weight of the pan, less the buoyancy of the pan due to the underlying air.

The desire for a particular positive pressure range within the system determines the weight that must be built into the pan. Once that has been determined, the pan is made with a sufficiently large diameter that the tension load at the inner edge of the membrane will not result in the membrane tearing. These parameters determine the structural characteristics of the pan, namely to provide weight in the right range, a sufficient diameter to protect the membrane, and a structural form that will remain of substantially fixed geometry.

The section length of the membrane between the top of the ring wall 50 and the rim of the pan is greater than the straight line therebetween so that the membrane can flex between the position sagging as in FIG. 3A with the pan at its lowest elevation and the position of greatest pan elevation as illustrated in FIG. 3B. For example, the straight line distance between the intermediate elevation ring wall and pan edge when the pan is resting on the floor is 11.35 meters, while the section length of the membrane is 13.565 meters. The slack of about 2.2 meters makes possible the sagging, and assures an allowable tension in the membrane at the moment when the pressure begins to raise the pan (the locus of greatest stress on the membrane).

As the membrane "inflates" when the pan is buoyed off the floor, it takes an approximately circular cross section between the ring wall and the pan. This balances the forces of tension in the membrane. When completely slack, the membrane lies approximately along a catenary. The radial length of the membrane surface is such that when the pan is in its lower elevation resting on the floor and there is no pressure differential across the membrane, the membrane sags only to an elevation above the floor, thereby preventing contact and possible chafing or other damage to the membrane.

The shape of the membrane is calculated so that there is adequate circumference of the membrane (from the center of the lung) for all positions of the membrane so that circumferential hoop tensions tending to burst the membrane do not arise at any position. Even if the membrane were made strong enough to hold the tension, the lack of circumference when the membrane became taut would prevent the membrane from taking its full circular shape and reduce the operating volume of the lung.

The problem of adequate circumference and hoop stresses arises because as the membrane and pan move vertically, every point on the membrane is moving to a new radius from the centerline of the pan. If a given point moves to a radius that is further from the center line, then the circumference of the membrane at that point must be sufficient to make the corresponding circle.

First, one assumes the section of the membrane at every position takes a circular shape due to the uniform pressure acting on it. At any given position, it is possible to calculate for many points on the membrane the radius from the center of the pan for each point for each position. By repeated calculations one can find the maximum radius for each point on the membrane for all vertical pan positions within its range of operation.

From the maximum radius for each point, one can lay out a membrane in a three dimensional form such that any point on the membrane is at a radius from the center of the pan which is equal to the maximum radius as previously determined, and also so that the distance of each point from a center reference is equal to the maximum radius for that arc length. The membrane made to this shape has a different circular band where it is taut at each vertical position of the pan. The other portions of the membrane are slightly slack and minor "wrinkling" may occur. Such wrinkling is preferable to having any band have a hoop tension. Generally speaking, the membrane surface approximates a surface of a toroid, but it deviates from a toroid as indicated to avoid tensile stress due to having insufficient circumference at any pan position.

Making the surface of the membrane approximate a toroidal surface also provides for the sagging of the membrane when the pan is resting on the floor and the volume of air in the closed system is insufficient to support the membrane in its uppermost position with the pan on the floor. This is an important fraction of the total variable volume of the system, amounting to about one quarter of the total volume change. That is, the volume change between the sagging membrane and the membrane position when the pan is just lifting off the floor is about one quarter of the total volume change between the sagging membrane position and the position with the pan at its uppermost travel. The sagging membrane position is outside the normal operating range of the system and represents reserve volume for exceptional conditions.

The pressure within the structure is a function of the weight of the pan and membrane over the total area under the pan and membrane, plus a contribution to pressure due to the connection between the perimeter of the membrane and the surrounding wall. There is an upward force exerted by the membrane on the wall as the membrane buoys upwardly. The magnitude of this force depends on the angle the membrane makes with respect to the wall. The force is greatest when the membrane is in its uppermost position and lowest when the membrane is at its lowest. This contribution is not trivial and the pressure within the structure can range from about 1000 dynes per square centimeter (2 psf.) above ambient pressure when the pan just lifts off the floor to almost 3000 dynes per square centimeter (6 psf) when the pan is at its absolute uppermost position. These, of course, are extremes which provide a margin of safety, and the normal operating range of pressure is about 1300 to 2000 dynes per square centimeter. The volume of air displaced by each lung of the exemplary dimensions between upper and lower elevations of the pan is over 21,000 cubic meters.

This floating of the pan and membrane on the cushion of air within the system maintains a reasonably constant pressure within the Biosphere 2, that is, a constant differential pressure relative to the external barometric pressure. The weight of the pan and membrane and the area encompassed within the lungs are designed to maintain a nominal positive pressure of about 1500 dynes per square centimeter (3 psf.) within the system at all times, thereby assuring that any leaks are in the outward direction.

The pressure in Biosphere 2 is maintained at a sufficient level above barometric pressure that there should be no inward leakage of air due to increased pressure against a face of the structure due to wind. It has been calculated that only in limited areas under abnormally high winds while the internal pressure within the structure is unusually low would there be any possibility of inward leakage.

The duct leading between the glass covered structure of the Biosphere 2 and the chamber under, that is, the inside face, the lung membrane is large enough to handle the flow of air due to normal volume changes without significant pressure differentials. The duct is also made small enough that if there were a catastrophic loss of sealing in Biosphere 2 (such as for example by massive glass breakage), the air flow through the duct would be slow enough that the pan would not be damaged by crashing onto the floor.

The pan provides a rigid "piston" surrounded by a membrane which bulges upwardly and encompasses a volume of air which can be mathematically calculated for any elevation of the pan. The height of the pan can be readily measured, thereby providing a measure of the volume of air within the Biosphere 2 system. The volume varies, of course, as changes occur in the environment within the system. About a hundred sensors of temperature and humidity are placed around Biosphere 2 to provide data from which volumetric changes can be calculated, and the expected height of the pans determined. This can be compared with actual height. Gas volume can be monitored over periods of time and trends in the location of the pan can be noted to determine if leaks are occurring through the walls of the system, or changes in total gas volume are changing significantly due to changes in the amounts of gaseous elements fixed in biomass within the system.

FIGS. 3A and 3B also clearly show how the duct 40 allows access to the underside of the membrane. The duct leads through the retaining wall 58, the weather cover 46 and a sealed opening in the ring wall 50 to a short staircase 70. The staircase leads to a flat floor around the entire lung inside the ring wall 50. During normal operations, the pan and its support posts are raised up off the floor and access to the sump and underside of the pan is possible.

As presently described, the barometric pressure within Biosphere 2 is determined by a combination of factors including Biosphere 2's internal atmospheric conditions, the weight of the membrane and pan and the exterior barometric pressure. The only easily controlled factor is the effective weight of the membrane and pan. Once the system is constructed however, the weight of the pan and membrane cannot be easily changed. If one wished a broader range of pressure control, a lighter pan could be built, and removable ballast added. A better way is, however, available.

A fan 72 is included in the weather cover. If the weather cover forms a reasonably good seal between the exterior atmosphere and the exterior side of the membrane and pan, then the fan can be used to modulate the barometric pressure within the upper portion of the lung on the membrane's outside face. By pumping air out of the weather cover, the pressure above the pan and membrane is reduced, and the pressure within Biosphere 2 is reduced. By pumping air into the weather cover, the barometric pressure inside Biosphere 2 can be increased. Thus, the fan 72 allows control over the differential air pressure between the inside of Biosphere 2 and the Earth's barometric pressure outside the structure.

The changes in pan elevation when differential pressure between the inside and outside of Biosphere 2 changes are rather small since only a small volume difference is involved. As mentioned above, the nominal differential pressure between the inside and outside of Biosphere 2 is about 1500 dynes per square centimeter. A movement of the two pans of only about 7.5 to 8 centimeters each is sufficient to nullify this excess pressure.

Biosphere 2 is provided with two lungs, each of which has a fan in the weather enclosure. It may be desirable from time to time to mix relatively stagnant air from within such a lung with air in the principal portion of the closed system. This is done by operating the fans in a type of push-pull fashion. One fan is operated for increasing the air pressure over one of the membranes and the other fan is operated for decreasing the air pressure over the other membrane. This causes one pan to move down while the other moves up, thereby displacing air between the respective chambers of the lungs and the balance of the closed system. Fan operation can be periodically reversed for alternately moving the membranes up and down and flushing air back and forth. Air pressure over the two membranes is increased and decreased synchronously so that the net pressure differential between the inside and outside of Biosphere 2 does not change appreciably during such push-pull pumping.

The fan is also valuable in the event of a major sealing loss. In normal use, the weight of the pan and membrane exert a small positive pressure to push any leaking gases out of Biosphere 2. If leaks became great, however, the travel of the pan and membrane would soon exhaust the variable volume of the lung. Before that occurs, one may actuate the fans to lower the pressure within the weather cover enough to compensate for the weight of the pan and membrane, eliminating the positive pressure. Thus, the pressure within the Biosphere may be adjusted to match the outside barometric pressure to stop forced air flow from within Biosphere 2 into the Earth's atmosphere. The only leakage would then be whatever convective transfer might occur until the leak is fixed.

Details of the flexible membrane are described and illustrated in U.S. patent application Ser. No. 07/630,269, now U.S. Pat. No. 5,279,031, issued Jan. 18, 1994, which is hereby incorporated by reference.

Although a variety of the features of the pressure compensating lungs of the present invention have been described in detail, it will be apparent that many modifications and variations are possible. The pressure compensating lungs may be used between any open and closed environments or between two separate closed environments to maintain the desired pressure relationship. The fluid for which the pressure is compensated may be air as with the Earth's atmosphere and Biosphere 2 or it may be some other fluid. It is also not necessary that the fluids be the same. For example, if the closed environment were under sea, the under sea environment would present the first pressure domain in terms of a sea water pressure and the closed environment would present the second pressure domain in terms of air pressure.

The pan allows a bias to be built into the pressure compensating lung by using gravity acting on the weight of the pan. The pressure differential between the pressure domains can be balanced by adjusting the weight of the pan, by using the fan or by using some other biasing device, including simple mechanical biases such as springs. The physical arrangement of the various features of the present invention as well as the details of the first and second pressure domains are subject to considerable variation from the specific embodiment described. The scope of the invention is not to be limited by the example described above but only by the following claims.

What is claimed is:

1. A closed ecological system comprising:
    a closed structure containing a variety of organisms which collectively maintain a viable environment within the closed system;
    a first closed chamber connected to the structure and having a pressure compensator for maintaining a selected pressure differential between the inside of the closed structure and the Earth's atmosphere;
    a second closed chamber connected to the structure and having pressure compensator for maintaining a selected pressure differential between the inside of the closed structure and the Earth's atmosphere, each pressure compensator comprising a movable impermeable member having one face in communication with the closed structure and a second face in communication with air outside the closed structure; and
    means for selectively varying the air pressure adjacent the second face of the movable member.

2. A closed ecological system as recited in claim 1 wherein each pressure compensator comprises a flexible membrane and a substantially closed housing outside the membrane, and each means for varying air pressure comprises a fan for moving air between the Earth's atmosphere and the inside of the respective housing.

3. A closed ecological system as recited in claim 1 wherein each flexible membrane comprises a rigid horizontal central pan and an annular flexible membrane around the pan.

4. A method for mixing air in a closed ecological system comprising the steps of:
    connecting the system to a first pressure compensator comprising a first flexible membrane between the inside of the system and the outside of the system;
    connecting the system to a second pressure compensator comprising a second flexible membrane between the inside of the system and the outside of the system; and
    alternately increasing and decreasing pressure on the outside of the first membrane while simultaneously decreasing and increasing pressure on the outside of the second membrane for moving air on the inside of the respective membranes.

5. A method as recited in claim 4 comprising increasing and decreasing pressure outside the respective membranes synchronously for maintaining an approximately constant net pressure differential between the inside and the outside of the closed system.

6. A method as recited in claim 4 comprising the steps of:

forming a first closed chamber outside the first membrane;

forming a second closed chamber outside the second membrane;

increasing air pressure in the first closed chamber while at the same time decreasing air pressure in the second closed chamber, and vice versa.

7. A method for mixing air in a closed ecological system comprising the steps of:

connecting a closed system to a pair of pressure compensators comprising movable members for maintaining a desired pressure differential between the inside of the system and the Earth's atmosphere; and synchronously moving the movable members in opposite directions for moving air adjacent to the members while maintaining an approximately uniform pressure differential between the inside of the system and the Earth's atmosphere.

8. A method for controlling pressure in a closed ecological system comprising the steps of:

connecting the closed system to a pressure compensator comprising a movable member with one face connected to the inside of the system and the other face outside of the system;

separating the outside face of the movable member from the ambient atmosphere; and varying the pressure on the outside face of the movable member for controlling the pressure on the inside face of the member, and hence pressure in the closed system.

9. A method as recited in claim 8 wherein the movable member comprises a flexible membrane and the varying step comprises reducing pressure on the outside face of the flexible membrane.

10. A method as recited in claim 8 wherein the movable member is generally horizontal and pressure is applied to the inside of the system by reason of weight of the movable member, and comprising the step of reducing pressure inside the system by reducing air pressure on the outside face of the movable member for reducing the effective weight of the movable member.

11. A method as recited in claim 10 wherein the movable member is in a closed housing and the reducing step comprises removing air from the closed housing.

12. A closed ecological system comprising a closed structure containing a variety of organisms which collectively maintain a viable environment within the closed system and characterized by:

a closed chamber connected to the structure and adjacent to a movable member for maintaining a selected pressure differential between the inside of the closed structure and the Earth's atmosphere; and means for selectively varying the air pressure outside the movable member for varying the pressure differential between the inside and outside of the closed structure.

13. A closed ecological system as recited in claim 12 comprising a second closed chamber connected to the structure and having a movable member for maintaining a selected pressure differential between the inside of the closed structure and the Earth's atmosphere.

14. A closed ecological system as recited in claim 13 wherein the movable member comprises a flexible membrane and the means for varying air pressure comprises a substantially closed housing outside the membrane and a fan for moving air between the Earth's atmosphere and the inside of the housing.

15. A closed ecological system as recited in claim 14 wherein the flexible membrane comprises a rigid horizontal central pan and an annular flexible membrane around the pan.

16. A closed ecological system as recited in claim 15 wherein the membrane has a surface approximately in the shape of a surface of a torus.

* * * * *

UNITED STATES PATENT AND TRADEMARK OFFICE
CERTIFICATE OF CORRECTION

PATENT NO. : 5,377,458
DATED : January 3, 1995
INVENTOR(S) : William F. Dempster It is certified that error appears in the above-indentified patent and that said Letters Patent is hereby corrected as shown below:

On the title page:

Item [56] References Cited, U.S. PATENT DOCUMENTS,
change "4,608,278  9/1986  Rhodes et al."
to    -- 4,608,785  9/1986  Rhodes et al. --

Column 1, line 9, change "1990now" to -- 1990, now --.

Column 7, line 40, change "pan is Just" to
-- pan is just --.

Signed and Sealed this

Twentieth Day of June, 1995

Attest:

BRUCE LEHMAN

*Attesting Officer*     *Commissioner of Patents and Trademarks*